(12) United States Patent
Katsura et al.

(10) Patent No.: US 9,321,334 B2
(45) Date of Patent: Apr. 26, 2016

(54) SUNROOF APPARATUS FOR VEHICLE

(71) Applicant: AISIN SEIKI KABUSHIKI KAISHA, Kariya-shi, Aichi-ken (JP)

(72) Inventors: Shintaro Katsura, Kariya (JP); Ryuta Fukada, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/478,726

(22) Filed: Sep. 5, 2014

(65) Prior Publication Data

US 2015/0069792 A1    Mar. 12, 2015

(30) Foreign Application Priority Data

Sep. 6, 2013    (JP) .................................. 2013-185556

(51) Int. Cl.
| | | |
|---|---|---|
| *B60J 7/19* | (2006.01) | |
| *B60J 7/043* | (2006.01) | |
| *B60J 7/02* | (2006.01) | |

(52) U.S. Cl.
CPC ................ *B60J 7/0435* (2013.01); *B60J 7/024* (2013.01)

(58) Field of Classification Search
CPC .......... B60J 7/0435; B60J 7/024; B60J 7/057; B60J 7/185
USPC ........................ 296/216.02–216.05, 223, 224
See application file for complete search history.

(56) References Cited

U.S. PATENT DOCUMENTS

| | | |
|---|---|---|
| 2009/0021056 A1 | 1/2009 | Manders et al. |
| 2011/0227372 A1 | 9/2011 | Hirata et al. |
| 2013/0264845 A1 | 10/2013 | Katsura et al. |

FOREIGN PATENT DOCUMENTS

| | | |
|---|---|---|
| DE | 3715268 | 1/1988 |
| EP | 2017108 | 1/2009 |
| EP | 2366571 | 9/2011 |
| JP | 2000-108676 A | 4/2000 |
| JP | 4109583 B | 4/2008 |

OTHER PUBLICATIONS

S. Katsura et al., "Vehicle Sunroof Apparatus," U.S. Appl. No. 14/475,818, filed Sep. 3, 2014.
S. Katsura et al., "Vehicle Sunroof Apparatus," U.S. Appl. No. 14/477,376, filed Sep. 4, 2014.
S. Katsura, "Sunroof Apparatus for Vehicle," U.S. Appl. No. 14/477,255, filed Sep. 4, 2014.
S. Katsura, "Sunroof Apparatus for Vehicle," U.S. Appl. No. 14/478,787, filed Sep. 5, 2014.

*Primary Examiner* — Dennis H Pedder
(74) *Attorney, Agent, or Firm* — Finnegan, Henderson, Farabow, Garrett & Dunner, LLP

(57) ABSTRACT

A sunroof apparatus for a vehicle includes a movable panel, a guide rail, a sliding member, a check mechanism restricting a movement of the movable panel in a front-rear direction in a case where the sliding member moves in a front direction of the vehicle in a fully closed state of the movable panel to bring the movable panel to a tilt-up state, a first member mounted to the sliding member, and a second member provided at said each edge portion of the movable panel in the vehicle width direction and being rotatably supported about an axis line extending in the vehicle front-rear direction. One of the sliding member and the first member includes a mounting recessed portion and the other of the sliding member and the first member includes a mounting projection fitted to the mounting recessed portion, the mounting projection restricted a movement in the front-rear direction.

14 Claims, 8 Drawing Sheets

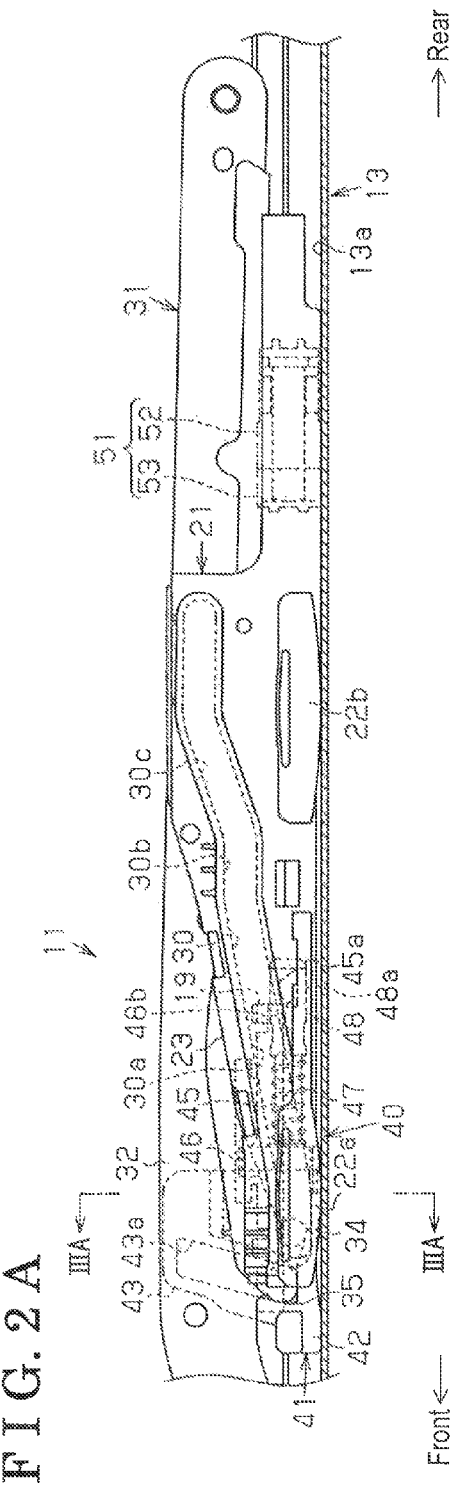
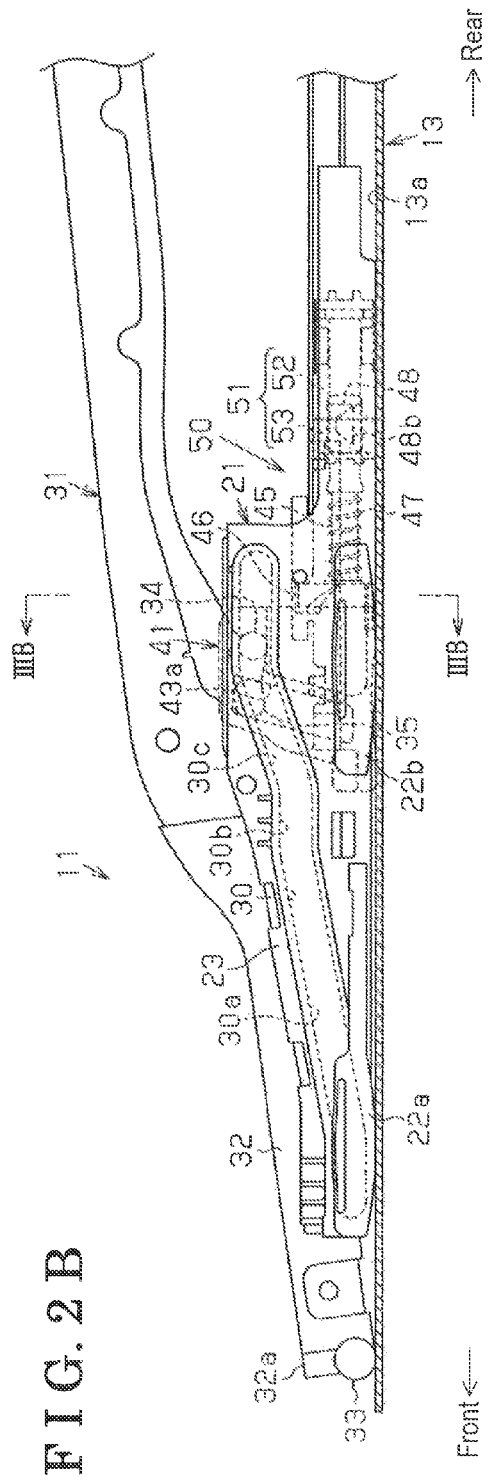
FIG. 2A
FIG. 2B

SUNROOF APPARATUS FOR VEHICLE

CROSS REFERENCE TO RELATED APPLICATIONS

This application is based on and claims priority under 35 U.S.C. §119 to Japanese Patent Application 2013-185556, filed on Sep. 6, 2013, the entire content of which is incorporated herein by reference.

TECHNICAL FIELD

This disclosure generally relates to a sunroof apparatus for a vehicle.

BACKGROUND DISCUSSION

A known sunroof apparatus for a vehicle is disclosed, for example, in JP2000-108676A, which will be hereinafter referred to as Reference 1. The sunroof apparatus disclosed in Reference 1 is a so-called outer sliding sunroof including a link mechanism for supporting a movable panel. Specifically, the link mechanism includes a rear lift link performing a swinging motion by a sliding operation of a first shoe, a front lift link performing a swinging motion by a sliding operation of a second shoe, and a connecting rod connecting the rear lift link and the second shoe so that the second shoe is slidably operated (i.e., performs the sliding operation) by the swinging motion of the rear lift link. In a case where the first shoe is slidably operated (i.e., performs the sliding operation), the rear link performs the swinging motion to lift up a rear end of the movable panel. During the aforementioned process, the swinging motion of the rear lift link is transmitted to the second shoe via the connecting rod. The resulting sliding operation of the second shoe causes the front lift link to perform the swinging motion to thereby lift up a front end of the movable panel. As a result, the movable panel is tilted up (i.e., performs a tilt-up operation).

Thereafter, the first shoe and the second shoe are slidably operated so that the movable panel slides outward (above a roof portion of a vehicle) while the movable panel is maintained to be tilted up (i.e., maintained in a tilt-up state). An opening formed at the roof portion is brought to an open state accordingly. At this time, the rear lift link performs the swinging motion by a function of an engagement structure provided between the rear lift link and the first shoe. Thus, because of specification of the engagement structure, the movable panel may be slowly tilted-up.

According to the sunroof apparatus disclosed in Reference 1, a moving amount (i.e., an operation stroke) of the first shoe or the like by which the movable panel is brought to a fully open state from a fully closed state is specifically the moving amount by which the movable panel is brought to the fully open state via the tilt-up state from the fully closed state. Thus, in a case where the moving amount of the first shoe or the like by which the movable panel is brought to the tilt-up state from the fully closed state (hereinafter also referred to as a tilt operation stroke) increases, the moving amount of the first shoe or the like by which the movable panel is brought to the fully open state, i.e., an amount of opening of the movable panel, may be difficult to be secured.

On the other hand, because the tilt operation stroke corresponds to an area of a high load state where the movable panel moves upward and downward, it is desirable for the tilt operation stroke to be elongated. When it is assumed that the tilt operation stroke is shortened, a load per unit operation stroke increases, which may result in an enlargement of an electric drive source (for example, a motor) for driving the first shoe or the like.

According to a sunroof apparatus for a vehicle serving as an outer sliding sunroof disclosed in JP4109583B which will be hereinafter referred to as Reference 2, it is proposed that a guide rail on which a shoe slidably moves projects forward in a state to penetrate through a front frame (housing). Accordingly, a supporting span of the movable panel may be widened while the opening amount of the movable panel increases or without deterioration of the opening amount of the movable panel.

Nevertheless, an effect obtained by the increase of the opening amount of the movable panel by the penetration of the guide rail through the front frame, for example, is insignificant. The opening amount of the movable panel is still difficult to be secured.

A need thus exists for a sunroof apparatus for a vehicle which is not susceptible to the drawback mentioned above.

SUMMARY

According to an aspect of this disclosure, a sunroof apparatus for a vehicle includes a movable panel configured to open and close an opening formed at a roof of a vehicle, a guide rail provided at each edge portion of the opening in a vehicle width direction and being extended in a front-rear direction of the vehicle, a first sliding member connected to each edge portion of the movable panel in the vehicle width direction and movably provided along the guide rail, the first sliding member being driven to move by a drive source, a check mechanism restricting a movement of the movable panel in a front-rear direction in a case where the first sliding member moves in a front direction of the vehicle in a fully closed state of the movable panel to bring the movable panel to a tilt-up state in which a rear portion of the movable panel is raised with a front portion of the movable panel as a fulcrum, the check mechanism releasing the restriction of the movement of the movable panel while maintaining the tilt-up state of the movable panel in a case where the first sliding member moves in the rear direction after moving further in the front direction in the tilt-up state of the movable panel, a first member mounted to the first sliding member, a second member provided at said each edge portion of the movable panel in the vehicle width direction and being rotatably supported about a first axis line extending in the vehicle front-rear direction. The first member and the second member configured to engage with each other so that the first member and the second member integrally move with the movable panel, the second member rotating when the first sliding member further moves in the front direction of the vehicle in the tilt-up state by a pressing effect between the first member and the second member, the second member further rotating when the first sliding member moves in the rear direction of the vehicle in the tilt-up state thereafter by the pressing effect between the first member and the second member. One of the first sliding member and the first member includes a mounting recessed portion. The other of the first sliding member and the first member includes a mounting projection fitted to the mounting recessed portion in a moving direction of the first member from an upper side to downward in a vehicle height direction, the mounting projection restricted a movement in the front-rear direction of the vehicle. One of the first sliding member and the first member includes an engagement pawl retaining the mounting projection.

BRIEF DESCRIPTION OF THE DRAWINGS

The foregoing and additional features and characteristics of this disclosure will become more apparent from the following detailed description considered with the reference to the accompanying drawings, wherein:

FIG. 2A is a side view illustrating a fully closed state of a movable panel;

FIG. 2B is a side view illustrating a second tilt-up state of the movable panel;

DETAILED DESCRIPTION

An embodiment will be explained with reference to the attached drawings. In the following, a front-rear direction corresponds to a vehicle front-rear direction, and an upper side and a lower side correspond to an upper side and a lower side in a vehicle height direction respectively. Further, a vehicle inner side and a vehicle outer side correspond to an inner side in a vehicle width direction towards a vehicle cabin and an outer side in the vehicle width direction away from the vehicle cabin respectively.

Figure 8:
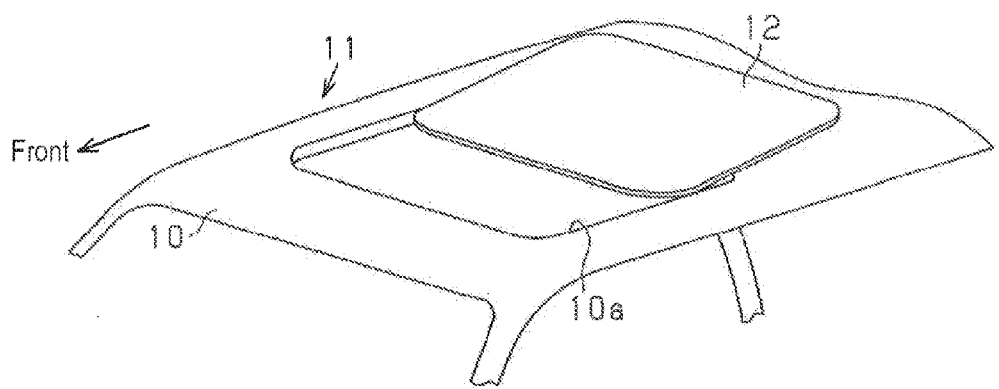
FIG. 8 is a perspective view of a roof at which the sunroof apparatus according to the embodiment is mounted and which is viewed in an obliquely upward direction.

As illustrated in FIG. 8, a substantially square or rectangular opening 10a is formed at a roof 10 of a vehicle such as an automobile, for example, and a sunroof apparatus 11 is mounted at the roof 10. The sunroof apparatus 11 includes a movable panel 12 substantially in a square or rectangular form made of glass plate, for example. The movable panel 12 moves in the front-rear direction for opening and closing the opening 10a.

The movable panel 12 is mounted at the roof 10 so as to selectively perform a tilt-up operation in which a rear portion of the movable panel 12 is lifted up or raised with reference to a front portion thereof and a slide operation in which the movable panel 12 slides in the front-rear direction. The sunroof apparatus 11 in the embodiment is a so-called outer sliding sunroof so that the movable panel 12 slides (performs the slide operation) while being maintained to be tilted-up (i.e., in a tilt-up state) during an opening and closing operation of the movable panel 12 for opening and closing the opening 10a.

Figure 9:
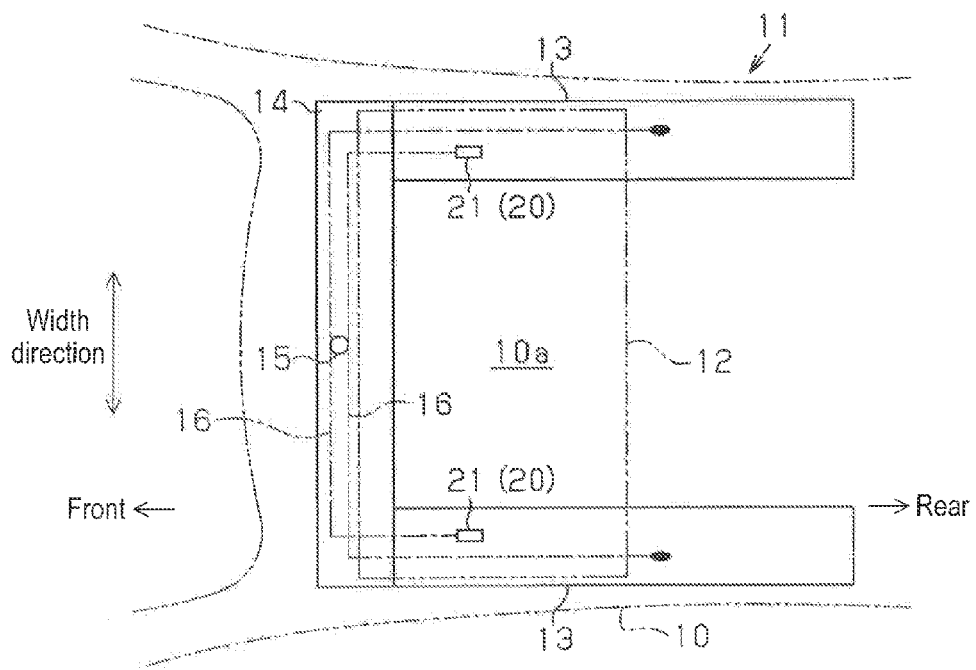
FIG. 9 is a plan view of the sunroof apparatus.

A configuration of the sunroof apparatus 11 related to the opening and closing operation of the movable panel 12 will be explained below. As illustrated in FIG. 9, a pair of guide rails 13 is provided at opposed edge portions of the opening 10a in the vehicle width direction. Each of the guide rails 13, which is made of aluminum alloy extruded material, for example, extends in the front-rear direction while including a constant cross section in a longitudinal direction of the guide rail 13. Functional components 20 are supported and guided relative to the respective guide rails 13 to be movable in the front-rear direction. The movable panel 12 is bridged between the functional components 20 at the respective guide rails 13 so as to be connected and supported at the functional components 20. The functional components 20 moves in the front-rear direction along the guide rails 13 to thereby bring the movable panel 12 to tilt-up or slide.

Respective front edges of the guide rails 13 are connected to each other by a front housing 14 that extends in the vehicle width direction. An electric drive source 15 such as an electric motor serving as a drive source and including an output gear, for example, is provided at a substantially intermediate portion of the front housing 14 in a longitudinal direction thereof. The electric drive source 15 is connected to the functional components 20 via a pair of drive belts 16 made of resin material, for example, and substantially formed in a strap form so as to simultaneously move the functional components 20 provided at the respective guide rails 13 in the front-rear direction.

Figure 3A:
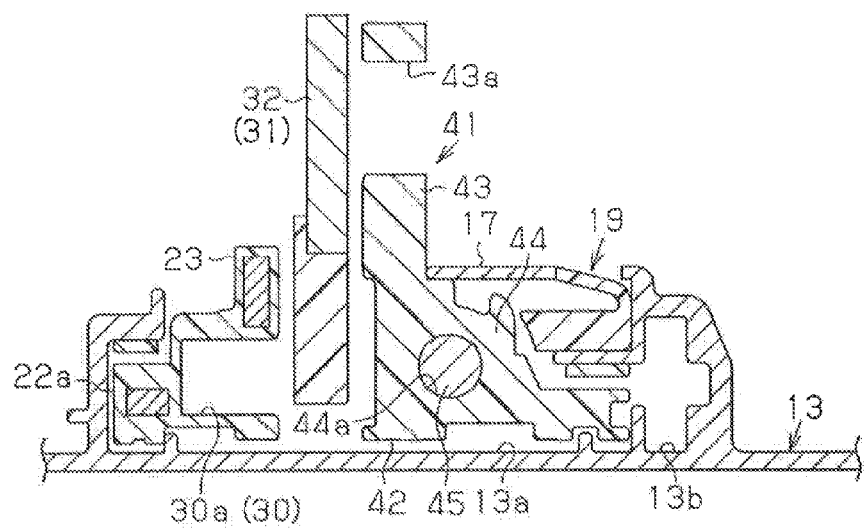
FIG. 3A is a cross-sectional view taken along line IIIA-IIIA in FIG. 2A.
Figure 3B:
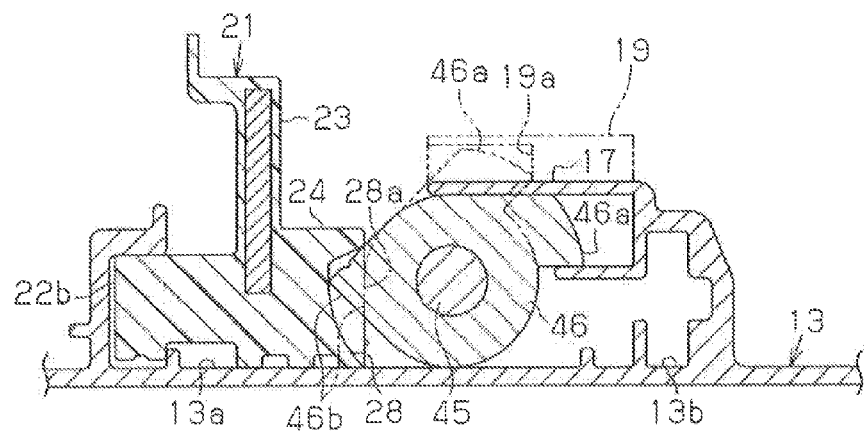
FIG. 3B is a cross-sectional view taken along line IIIB-IIIB in FIG. 2B.

As illustrated in FIGS. 3A and 3B, each of the guide rails 13 includes a first rail portion 13a including a substantially C-shape cross section opening upward and a second rail portion 13b disposed adjacent to the first rail portion 13a at the vehicle outer side thereof. The second rail portion 13b, which includes a substantially T-shape cross section in cooperation with a side wall of the first rail portion 13a, is connected to the first rail portion 13a via an opening formed at the side wall of the first rail portion 13a. In each of the guide rails 13, a guide portion 17 in a flange form is formed at an upper side of a portion of the first rail portion 13a at the vehicle outer side (i.e., a vehicle outer side portion of the first rail portion 13a).

Figure 1:
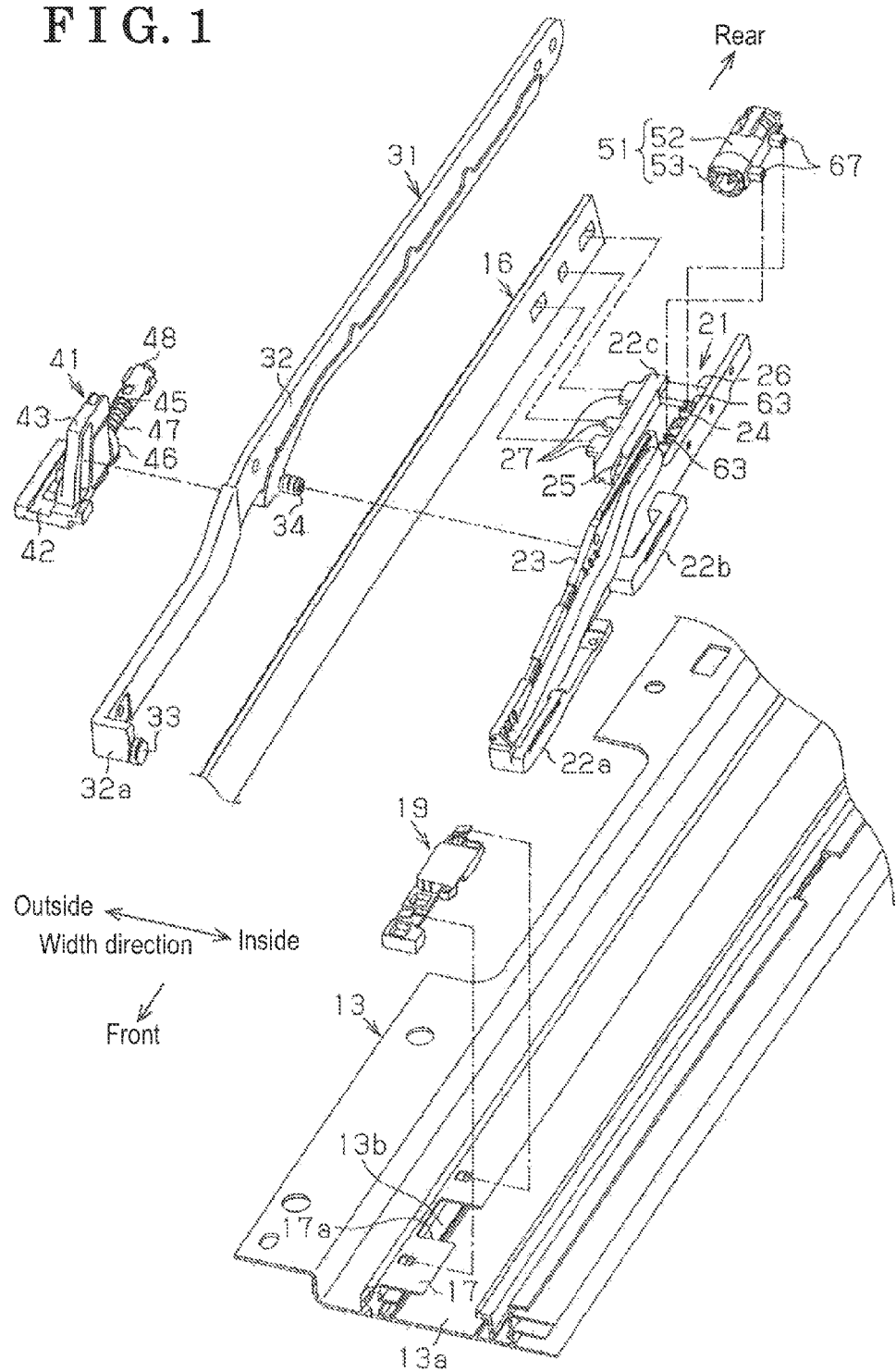
FIG. 1 is an exploded perspective view of a sunroof apparatus for a vehicle according to an embodiment disclosed here.
Figure 4:
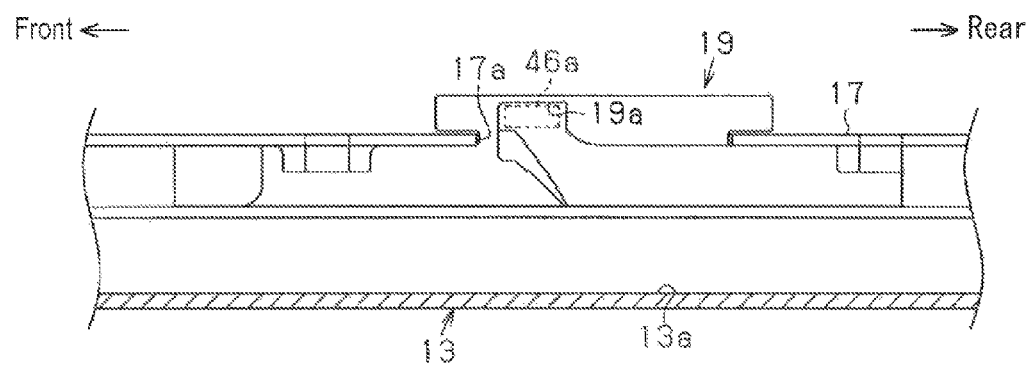
FIG. 4 is a side view illustrating a guide block and a peripheral structure of the guide block.

As illustrated in FIGS. 1 and 4, a cut-out portion 17a is formed at a predetermined position of the guide portion 17 closer to the front side of the vehicle. Then, a guide block 19 is fixed to the guide rail 13 in a state to be placed at the vehicle outer side portion of the first rail portion 13a and fitted to the guide portion 17 via the cut-out portion 17a. The guide block 19 is formed in a hook form by including an engagement groove 19a continuously formed from an upper side to a lower side of the guide portion 17 at the rear side of the vehicle. The engagement groove 19a is inclined downward towards the rear side of the vehicle and is connected, via a lower end of the engagement groove 19a, to a lower side of the guide portion 17.

Figure 6:
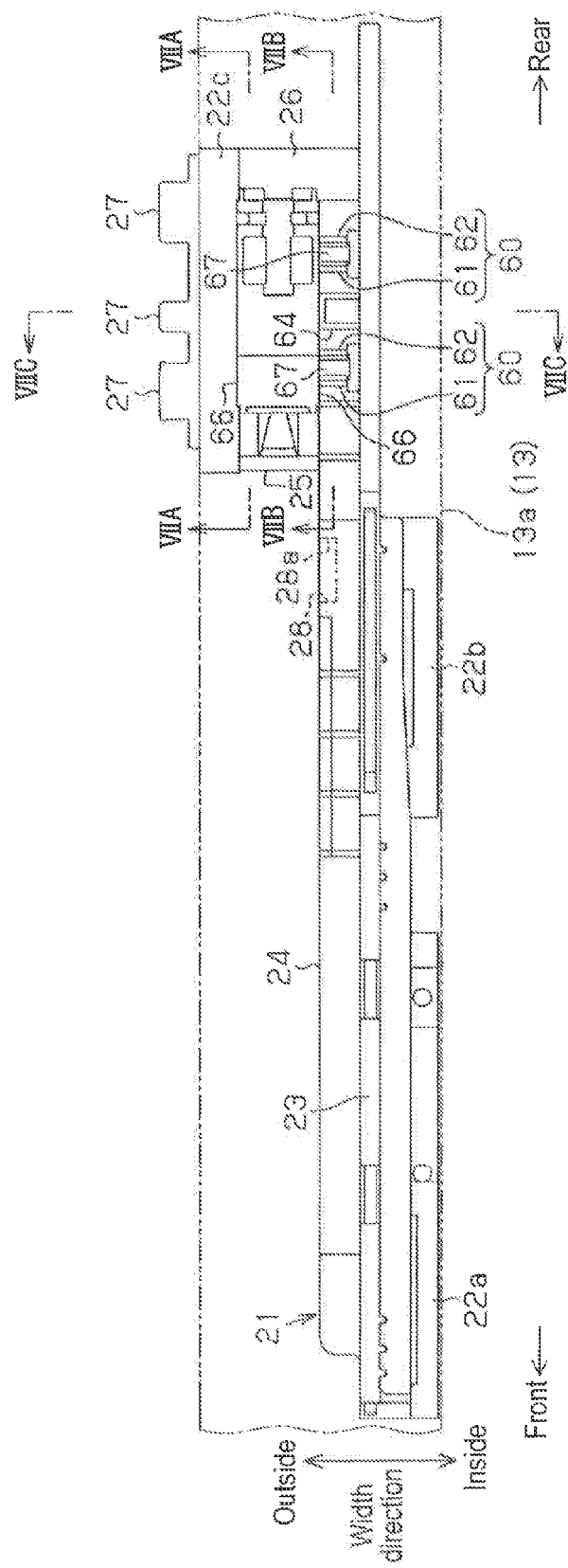
FIG. 6 is a plan view of a drive shoe at which a fixation cam is provided.

As illustrated in FIG. 1, a drive shoe 21 (i.e., serving as a first sliding member) is mounted to each of the guide rails 13 (specifically, to the first rail portion 13a) so as to be movable in the front-rear direction. The drive shoe 21 serving as a first sliding member is formed, for example, by metallic plate and resin which are integrated. As also illustrated in FIG. 6, the drive shoe 21 includes a pair of shoe portions 22a and 22b disposed apart from each other in the front-rear direction to slide on a portion of the first rail portion 13a at the vehicle inner side (i.e., a vehicle inner side portion of the first rail portion 13a), and a shoe portion 22c sliding on the vehicle outer side portion of the first rail portion 13a (i.e., at an upper left side in FIG. 1). The shoe portion 22c is provided at the rear side of the shoe portion 221). The drive shoe 21 also includes a vertical wall portion 23, a projection wall portion 24, a connection wall portion 25, and a connection wall portion 26. The vertical wall portion 23 is formed to stand upward at a substantially intermediate portion and closer to the vehicle inner side of the first rail portion 13a so as to connect the shoe portions 22a and 22b each other by extending in the front-rear direction. The projection wall portion 24 is formed to protrude by a substantially constant distance from a lower end portion of the vertical wall portion 23 to the vehicle outer side. The projection wall portion 24 extends in the front-rear direction over an entire length of the vertical wall portion 23 in a longitudinal direction thereof. The projection wall portion 24 protrudes and recesses in the vehicle height direction. The connection wall portion 25 connects a rear end portion of the projection wall portion 24 and a front end portion of the shoe portion 22c in the vehicle width direction. The connection wall portion 26 is disposed adjacent to the projection wall portion 24 in the rear of the vehicle to connect a rear end portion of the vertical wall portion 23 and a rear end portion of the shoe portion 22c in the vehicle width direction.

The drive shoe 21 includes plural projecting pieces 27 (for example, three projecting pieces 27 in the embodiment) penetrating through the shoe portion 22c to enter the inside of the second rail portion 13b provided at the vehicle outer side relative to the first rail portion 13a. The projecting pieces 27 are connected to the corresponding drive belt 16 sliding on the second rail portion 13b in the front-rear direction. That is, the electric drive source 15 is connected to each of the functional components 20 via the drive shoe 21. Because each of the drive belts 16 is driven by the electric drive source 15 to move along the guide rail 13 (specifically, the second rail portion 13b) in the front-rear direction, the drive shoe 21 moves in the front-rear direction in a state where the shoe portions 22a and 22b slide on the vehicle inner side portion of the first rail portion 13a and the shoe portion 22c slides on the vehicle outer side portion of the first rail portion 13a.

As illustrated in FIGS. 3B and 6, the drive shoe 21 includes an engagement recess portion 28 provided at a substantially intermediate portion of the projection wall portion 24 in the longitudinal direction thereof and at the front side of the vehicle relative to the connection wall portion 25. The engagement recess portion 28 is recessed to the vehicle inner side from an end surface of the projection wall portion 24 at the vehicle outer side. A rear end surface of the engagement recess portion 28 forms a restriction portion 28a.

As illustrated in FIGS. 2A and 2B, a guide groove 30 that extends in the front-rear direction is formed at the vertical wall portion 23 to be recessed to the vehicle inner side from an end surface of the vertical wall portion 23 at the vehicle outer side. The guide groove 30 includes a first inclination portion 30a, a linear portion 30b, and a second inclination portion 30c those of which are integrally formed. The first inclination portion 30a is inclined upward towards the rear side of the vehicle. The linear portion 30b is connected to a rear end of the first inclination portion 30a to extend substantially in parallel to the guide rail 13. The second inclination portion 30c is connected to a rear end of the linear portion 30b to incline upward towards the rear side of the vehicle.

A pair of support brackets 31 is fixed to a lower surface of the movable panel 12 in a state to be disposed at opposed edge portions of the movable panel 12 in the vehicle width direction. Each of the support brackets 31, which is made of metallic plate, for example, extends over a substantially entire length of the movable panel 12. The support bracket 31 includes a vertical wall portion 32 in a plate form vertically provided at the lower surface of the movable panel 12. The vertical wall portion 32 is disposed adjacent to the vertical wall portion 23 of the drive shoe 21 at the vehicle outer side thereof so as to be positioned at the upper side of the projection wall portion 24 of the drive shoe 21.

An attachment piece 32a is formed at a front end of the vertical wall portion 32 to bend towards the vehicle inner side. A driven shoe 33 made of resin material and formed in a substantially column is connected to an end of the attachment piece 32a to be rotatable about an axis line extending in the vehicle width direction. The driven shoe 33 is provided to be movable on the first rail portion 13a of the guide rail 13 in the front-rear direction at the front side of the drive shoe 21 (specifically, the shoe portions 22a and 22b). The movable panel 12 supported by the support brackets 31 is tilted-up (i.e., performs the tilt-up operation) so that a rear portion of the support bracket 31 (i.e., of the movable panel 12) is raised with reference to a front portion at which the vertical wall portion 32 is connected to the driven shoe 33 (the attachment piece 32a) and is tilted-down (i.e., performs a tilt-down operation) so that the rear portion of the support bracket 31 (the movable panel 12) is lowered with reference to the front portion. The drive shoe 21 and the driven shoe 33 constitute the functional component 20. The tilt-up operation and the tilt-down operation will be hereinafter collectively referred to as the tilt operation.

A guide pin 34 projecting to the vehicle inner side is integrally formed at a front portion of the support bracket 31 (specifically, the vertical wall portion 32). The guide pin 34 is movably fitted to the guide groove 30. As illustrated in FIG. 2A, the guide pin 34 is configured to be disposed at a lower end of the guide groove 30 (specifically, the first inclination portion 30a) in a fully closed state of the movable panel 12. Thus, in a case where the drive shoe 21 moves to the front side along the guide rail 13 in the aforementioned configuration, the guide pin 34 that is guided by the guide groove 30 moves upward at the first inclination portion 30a to reach the linear portion 30b. At this time, because of the rising of the support bracket 31 (the guide pin 34) with reference to the drive shoe 21, the movable panel 12 rotates relative to the front portion of the support bracket 31, which results in the tilt-up operation of the movable panel 12 in which the rear portion of the support bracket 31 (the movable panel 12) is raised with reference to the front portion thereof. The movable panel 12 is brought in a first tilt-up state accordingly.

In a case where the drive shoe 21 moves further to the front side along the guide rail 13 (i.e., the first rail portion 13a), as illustrated in FIG. 2B, the guide pin 34 that is guided by the guide groove 30 moves upward at the second inclination portion 30c to reach an end (a rear end) thereof. At this time, because of the rising of the support bracket 31 (the guide pin 34) with reference to the drive shoe 21, the movable panel 12 further rotates relative to the front portion of the support bracket 31, which results in the tilt-up operation of the movable panel 12 in which the rear portion of the support bracket 31 (i.e., the movable panel 12) is further raised with reference to the front portion thereof. The movable panel 12 is brought in a second tilt-up state accordingly.

On the other hand, in a case where the drive shoe 21 moves to the vehicle rear side in the tilt-up state of the movable panel 12 (i.e., in the first tilt-up state or the second tilt-up state), the drive shoe 21 is operated substantially in reverse order from the aforementioned order. A locking pin 35 is integrally formed at a front end portion of the support bracket 31 (the vertical wall portion 32) at the front side of the guide pin 34. The locking pin 35 formed in a substantially elongated column projects to the vehicle outer side.

As illustrated in FIG. 1, a slide check 41 is attached to the guide rail 13 (the first rail portion 13a) to be positioned adjacent to the vertical wall portion 32 at the vehicle outer side thereof. The slide check 41, which is made of resin material, for example, is movable in the front-rear direction. As illustrated in FIG. 3A, the slide check 41 includes a shoe portion 42 and a vertical wall portion 43. The shoe portion 42 slides on the vehicle outer side portion of the first rail portion 13*a* at the front side of the shoe portion 22*c*. The vertical wall portion 43 is formed to stand upwardly between the vertical wall portion 32 of the support bracket 31 and the guide portion 17 in the vehicle width direction. The slide check 41 is movable along the guide rail 13 in the front-rear direction by the shoe portion 42 sliding on the vehicle outer side portion of the first rail portion 13*a* in a state where the position of the slide check 41 in the vehicle width direction is determined by the vertical wall portion 32 and the guide portion 17 those of which make contact with or come closer to the vertical wall portion 43.

As illustrated in FIGS. 2A and 2B, a bore 43*a* formed by an elongated bore is formed at a front end portion of the vertical wall portion 43 so that the locking pin 35 is movably fitted to the bore 43*a*. The bore 43*a* is formed to linearly upwardly incline towards the rear side of the vehicle. The slide check 41 is connected to the support bracket 31 via the locking pin 35 that is fitted to the bore 43*a*. The slide check 41 secures the aforementioned operation state of the drive shoe 21 on the guide rail 13 by the locking pin 35 that freely moves within the bore 43*a* in a case where the movable panel 12 supported by the support bracket 31 is tilted-up or tilted-down. That is, the slide check 41 allows the movable panel 12 to be brought to the tilt-up state or the fully closed state in association with the movement of the drive shoe 21 in the front-rear direction by the locking pin 35 that freely moves within the bore 43*a*. In addition, in a case where the tilt operation of the movable panel 12 is prohibited, the slide check 41 restricts the movement of the locking pin 35 (the support bracket 31) in the front-rear direction at the bore 43*a*. Accordingly, the slide check 41 integrally moves with the movable panel 12 that is supported by the support bracket 31 in the front-rear direction (corresponding to the slide operation) by moving in the front-rear direction.

As illustrated in FIG. 3A, the slide check 41 includes a build-up portion 44 formed in a substantially quarter column connecting the shoe portion 42 and the vertical wall portion 43 at a lower side of the guide portion 17. The build-up portion 44 includes a support recess portion 44*a* in a substantially circular form recessed from a rear end surface of the build-up portion 44 towards the vehicle front side. A support shaft 45 formed in a substantially column of which a center line extends in the front-rear direction is inserted to be positioned within the support recess portion 44*a* in a non-rotatable manner. As illustrated in FIGS. 2A and 2B, a rotation check 46 substantially in a disc form is supported at a front end portion of the support shaft 45 that projects from the slide check 41 so as to be disposed adjacent to the slide check 41. Accordingly, an axis line (i.e., serving as a second axis line) of the rotation check 46 coincides with the center line of the support shaft 45.

As illustrated in FIG. 3B, the rotation check 46 includes an engagement projection 46*a* in a substantially sawtooth form at a predetermined angular position (i.e., an angular position to the right in FIG. 3B) with reference to the support shaft 45 to project radially, outwardly. In addition, the rotation check 46 includes a pressed portion 46*b* in a triangular tooth form at a predetermined angular position (i.e., an angular position to the left in FIG. 3B) with reference to the support shaft 45 to project radially outwardly. As illustrated by a chain double-dashed line in FIG. 3B, the engagement projection 46*a* engages with the engagement groove 19*a* of the guide block 19 and the pressed portion 46*b* makes contact with or comes closer to a bottom surface of the first rail portion 13*a* and an outer side surface of the projection wall portion 24 in the fully closed state of the movable panel 12, for example. Thus, in the fully closed state of the movable panel 12, the rotation check 46 is restricted to rotate by the bottom surface of the first rail portion 13*a*, for example, in a state where the engagement projection 46*a* engages with the engagement groove 19*a* of the guide block 19. The rotation check 46 is inhibited from moving in the front-rear direction and the slide check 41 is also inhibited from moving in the front-rear direction together with the rotation check 46. In addition, the support bracket 31 connected to the slide check 41 via the bore 43*a*, for example, is inhibited from moving in the front-rear direction so that the movable panel 12 is only allowed to move from the fully closed state to the tilt-up state. The guide block 19, the slide check 41, the rotation check 46, and the like constitute a check mechanism 40.

As mentioned above, the engagement recess portion 28 is formed at the projection wall portion 24 of the drive shoe 21. Thus, in a case where the engagement recess portion 28 reaches a position at which the pressed portion 46*b* is provided in association with the movement of the drive shoe 21 in the front direction of the vehicle, the rotation check 46 is allowed to rotate within the engagement recess portion 28. In the aforementioned state, when the rotation check 46 moves together with the drive shoe 21 in the rear direction of the vehicle, the rotation check 46 rotates in a clockwise direction as illustrated by a solid line in FIG. 3B because the engagement projection 46*a* is guided by the engagement groove 19*a*. Then, the engagement projection 46*a* enters below the guide portion 17 to be sandwiched between the guide portion 17 and the first rail portion 13*a*. The rotation of the rotation check 46 is restricted accordingly. At the same time, the pressed portion 46*b* engages with the engagement recess portion 28. At this time, the pressed portion 46*b* is disposed on a movement locus of the restriction portion 28*a* of the drive shoe 21 in the front-rear direction.

As illustrated in FIG. 2A, an enlarged diameter portion 45*a* substantially in a disc form is formed at a rear end of the support shaft 45. A rotation cam 48 (i.e., serving as a second member) is supported at a rear end portion of the support shaft 45 to be disposed adjacent to the enlarged diameter portion 45*a* at the front side thereof. The rotation cam 48, which is made of resin material, for example, serves as a second member. The rotation cam 48 includes a body portion 48*a* in a substantially cylindrical form that includes an inner diameter substantially equal to an outer diameter of the support shaft 45 and an outer diameter substantially equal to an outer diameter of the enlarged diameter portion 45*a*. The rotation cam 48 is supported at the support shaft 45 via the body portion 48*a*. Accordingly, an axis line (i.e., serving as a first axis line) of the rotation cam 48 coincides with the center line of the support shaft 45. That is, the rotation cam 48 is disposed to be coaxial with the rotation check 46.

A coil spring 47 is wound on the support shaft 45 between the rotation check 46 and the rotation cam 48. The coil spring 47 is compressed in the front-rear direction corresponding to an axial direction of the coil spring 47. The coil spring 47 biases the rotation check 46 in a direction where the rotation check 46 makes contact with the slide check 41 and biases the rotation cam 48 in a direction where the rotation cam 48 makes contact with the enlarged diameter portion 45*a*. The rotation cam 48 is inhibited from disengaging rearward of the vehicle by the enlarged diameter portion 45*a*.

Figure 5:
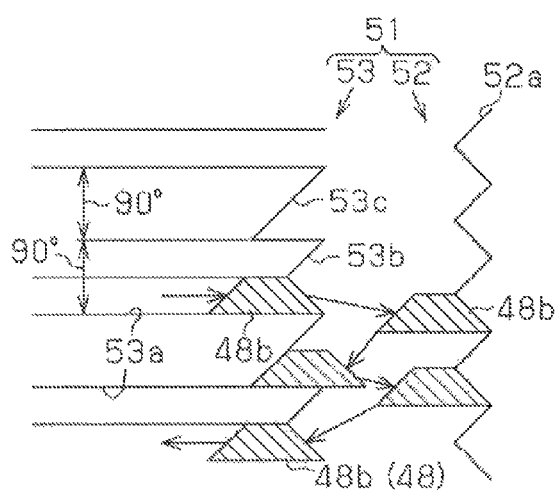
FIG. 5 is an explanatory view illustrating an operation of an engagement and disengagement switching mechanism by deploying the engagement and disengagement switching mechanism in a circumferential direction.

As illustrated in FIG. 5, the rotation cam 48 includes a pair of second cam teeth 48*b* formed to project at an outer peripheral surface of the body portion 48a. Each of the second cam teeth 48b is formed in a substantially isosceles trapezoid where each long side and each short side extend in the front-rear direction. The pair of second cam teeth 48b faces each other in a radial direction of the rotation cam 48 relative to the axis line thereof. Each of the second cam teeth 48b extends within a range of a smaller angle (i.e., 45° in the present embodiment) than a predetermined angle (i.e., 90° in the present embodiment) in a circumferential direction of the rotation cam 48 relative to the axis line thereof.

As illustrated in FIG. 1, a fixation cam 51 (i.e., serving as a first member) made of resin material, for example, and serving as a first member is placed at the drive shoe 21 in a state to bridge between the connection wall portions 25 and 26. As illustrated in FIG. 2A, the fixation cam 51 is disposed away from the rotation cam 48 in a state where the drive shoe 21 is disposed at a position that is achieved when the movable panel 12 is shifted at least from the fully closed state to the first tilt-up state. As illustrated in FIG. 2B, positions of the fixation cam 51 and the rotation cam 48 in the front-rear direction overlap each other in a state where the drive shoe 21 is disposed at a position that is achieved when the movable panel 12 is shifted to the second tilt-up state. The fixation cam 51 includes a first fixation member 52 in a substantially cylindrical form with a bottom and a second fixation member 53 in a substantially cylindrical form. The first fixation member 52 is disposed at a side away from the slide check 41 while the second fixation member 53 is disposed at a side closer to the slide check 41.

As illustrated in FIG. 5, plural first cam teeth 52a formed by substantially triangular teeth are formed at a front end portion (i.e., an opening end portion) of the first fixation member 52 so as to be disposed at each aforementioned predetermined angle (i.e., 90°) around an axis line of the first fixation member 52 in a state to protrude and to be recessed (in a projection and recess manner) in an axial direction thereof. A pair of open portions 53a is formed at an inner peripheral portion of the second fixation member 53 no that each of the open portions 31a is continuously formed along an axial direction thereof. The open portions 53a face each other in a radial direction of the second fixation member 53. A rear end portion of each of the open portions 53a at an upper side in FIG. 5 is gradually inclined to expand towards the rear end to thereby form a guide portion 53b. Each of the open portions 53a that is continuously formed over an entire axial length of the second fixation member 53 extends within the range of the equal angle (i.e., 45°) to each of the first cam teeth 52a in the circumferential direction relative to the axis line of the fixation cam 51. Each of the open portions 53a including the guide portion 53b extends within the range of the aforementioned predetermined angle (i.e., 90°) in the circumferential direction.

A pair of locking portions 53c is formed at a rear end portion (i.e., an opening end portion) of the second fixation member 53 between the open portions 53a in the circumferential direction. Each of the locking portions 530 is inclined to the front side from the open portion 53a towards the guide portion 53b. In addition, each of the locking portions 53c extends within the range of the aforementioned predetermined angle (90°) in the circumferential direction relative to the axis line of the fixation cam 51. Both apexes of the first cam teeth 52a at which the first cam teeth 52a change the direction of extension in the front-rear direction face circumferentially intermediate portions of the locking portions 53c in the front-rear direction. That is, a phase difference of a predetermined angle smaller than the aforementioned predetermined angle (90°) is specified between both apexes of the locking portions 53c at which the locking portions 53c change the direction of extension in the front-rear direction and the both apexes of the first cam teeth 52a at which the first cam teeth 52a change the direction of extension in the front-rear direction. Each of the apexes of the first cam teeth 52a is displaced from each of the apexes of the locking portions 53c in the circumferential direction.

In the aforementioned configuration, in a state where the rotation cam 48 (the slide check 41) is disposed away from the fixation cam 51 in the front-rear direction (for example, until the movable panel 12 is shifted to the first tilt-up state from the fully closed state), angular positions of the second cam teeth 48b are retained by a biasing force of the coil spring 47, for example, so as to coincide with angular positions of the open portions 53a. Therefore, in a case where the fixation cam 51 moves in the front direction of the vehicle together with the drive shoe 21 so as to shift the movable panel 12 to the tilt-up state, the second cam teeth 48b pass through the open portions 53a to be pressed by the first cam teeth 52a because a moving path (a path) of the second cam teeth 48b to the first cam teeth 52a is opened by the open portions 53a as illustrated in FIG. 5. At this time, the second cam teeth 48b are guided by the first cam teeth 52a to rotate by the aforementioned phase difference between the locking portions 53c and the first cam teeth 52a. Accordingly, in a case where the fixation cam 51 thereafter moves in the rear direction of the vehicle together with the drive shoe 21, the moving path of the second cam teeth 48b to the first earn teeth 52a (a path for retracting from the first cam teeth 52a) is closed by the locking portions 53c, or the second cam teeth 48b is blocked by the locking portions 53c when retracting from the first cam teeth 52a.

Accordingly, in a case where the fixation cam 51 moves in the rear direction of the vehicle together with the drive shoe 21 so that the movable panel 12 slides rearward of the vehicle (i.e., an opening operation is performed), the second cam teeth 48b are guided to rotate by the locking portions 53c to engage therewith as illustrated in FIG. 5. As a result, the rotation cam 48 and the fixation cam 51 engage with each other by a pressing effect between the fixation cam 51 and the rotation cam 48 so that the slide check 41 integrally moves to the vehicle rear side. In addition, the support bracket 31 that is connected to the slide check 41 via the locking pin 35 also integrally moves in the rear direction of the vehicle. The rotation cam 48, the fixation cam 51, and the like constitute an engagement and disengagement switching mechanism 50.

Figure 7A:
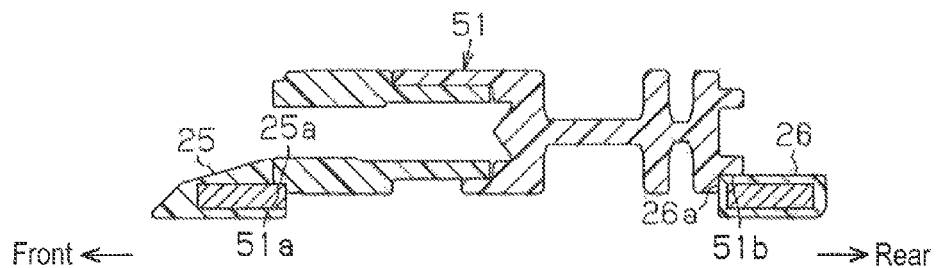
FIG. 7A is a cross-sectional view taken along line VIIA-VIIA in FIG. 6.

A mounting structure of the fixation cam 51 to the drive shoe 21 will be explained as follows. As shown in FIG. 7A, a first cut-out portion 25a which displaces an upper portion of a rear end of the connection wall portion 25 of the drive shoe 21 in the vehicle front direction relative to a lower portion of the rear end of the connection wall portion 25 is formed. Further, a second cut-out portion 51a which displaces an upper portion of a front end lower portion of the fixation cam 51 in vehicle front direction relative to a lower portion of the front end lower portion of the fixation cam 51 is formed. Further, a third cut-out portion 51b which displaces an upper portion of a rear end lower portion of the fixation cam 51 in the vehicle rear direction relative to a lower portion is formed. The fixation cam 51 is restricted the movement in the front-rear direction by fitting the second and third cut-out portions 51a, 51b to the first cut-out portion 25a and the corner portion 26a of the connection wall portion 26 which is positioned at a front end upper portion, respectively. The first cut-out portion 25a and the corner portion 26a serve as front-rear direction restriction portions.

Figure 7B:
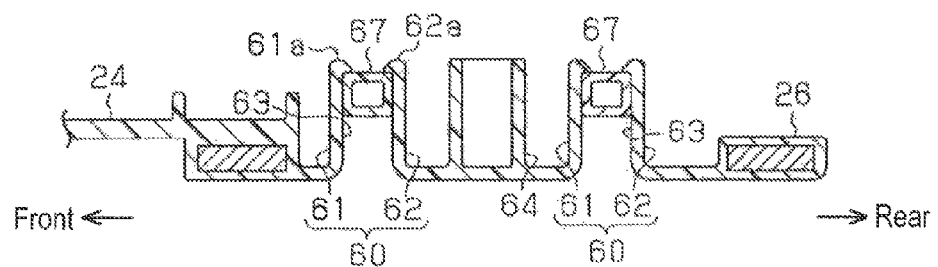
FIG. 7B is a cross-sectional view taken along line VIIB-VIIB in FIG. 6.

As shown in FIGS. 6 and 7B, a mounting portion 60 includes a pair of substantially board-shaped clamping pieces 61, 62 which are positioned in parallel and next to each other in the front-rear direction. The mounting portions 60 serve as a pair and are provided at a rear end portion of the projection wall portion 24 in the front-rear direction. Each of the mounting portions 60 forms a mounting recessed portion 63 which is positioned between the clamping pieces 61, 62 and opens upward and outward of the vehicle. Further, engagement pawls 61a, 62a are formed on upper ends of the clamping pieces 61, 62, respectively, and protrude in the front-rear direction so as to face with each other. The projection wall portion 24 includes a restriction wall portion 64 formed in a substantially U-shape in a plan view. The restriction wall portion 64 is interposed by the opposing mounting portions 60 therebetween in the front-rear direction.

Figure 7C:
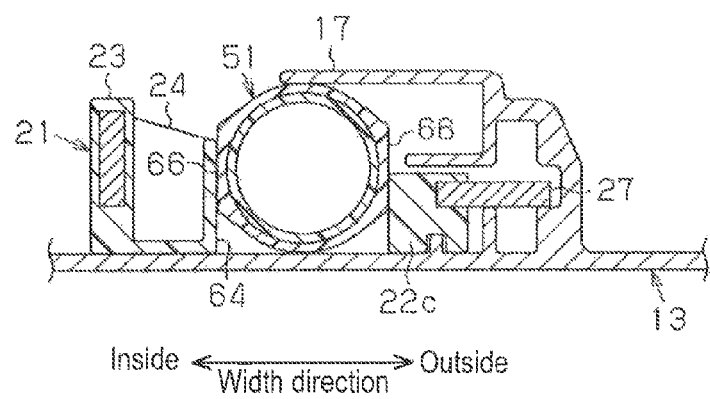
FIG. 7C is a cross-sectional view taken along line VIIC-VIIC in FIG. 6.

On the other hand, as shown in FIGS. 6 and 7C, an outer peripheral portion of the fixation cam 51 includes flat surfaces 66 which are formed in parallel and face with each other in the vehicle width direction. The fixation cam 51 includes a pair of mounting projections 67 in the front-rear direction. The mounting projections 67 are formed in substantially quadrilateral tube-shape and protrude to the vehicle inner side from the flat surface 66 which is positioned at the vehicle inner side. A distance between the mounting projections 67 in the front-rear direction is set to be the same or substantially the same to a distance between the mounting recessed portions 63. When the fixation cam 51 moves from an upper side to downward in a state where the mounting projections 67 face the mounting recessed portions 63 in the vehicle height direction, respectively, each of the mounting projections 67 fits each of the mounting recessed portions 63. Accordingly, the mounting projections 67 are restricted the movement in the front-rear direction. In those circumstances, the engagement pawls 61a, 62a engage an upper surface of the mounting projection 67 to retain the mounting projection 67.

As shown in FIG. 70, a distance between the flat surfaces 66 in the vehicle width direction is set to be the same or substantially the same to a distance between the shoe portion 22c and the restriction wall portion 64. Thus, the fixation cam 51 is restricted the movement in the vehicle width direction by being interposed by the shoe portion 22c and the restriction wall portion 64 therebetween at the flat surfaces 66. The shoe portion 22c and the restriction wall portion 64 serve as width-direction restriction portions.

In a state where the drive shoe 21 and the members connected to the drive shoe 21 are mounted to the guide rail 13, the fixation cam 51 is restricted the movement from a lower side to upward by the guide portion 17 which comes in contact or comes in close contact with the upper end of the fixation cam 51. The guide portion 17 serves as an upward restriction portion.

The operation of the sunroof apparatus 11 in the embodiment will be explained. In the closed state of the movable panel 12, the rotation check 46 is restricted from rotating by the bottom surface of the first rail portion 13a, for example, in a state where the engagement projection 46a engages with the engagement groove 19a of the guide block 19. Therefore, the movement of the rotation check 46 in the front-rear direction is restricted and also the movement of the slide check 41 in the front-rear direction is restricted together with the rotation check 46. Further, the movement of the support bracket 31 connected to the slide check 41 via the bore 43a, for example, in the front-rear direction is restricted. As a result, the movable panel 12 is only allowed to be tilted-up, i.e., the rear portion of the support bracket 31 is lifted up with reference to the front portion thereof.

In the aforementioned state, in a case where the drive shoe 21 moves in the front direction of the vehicle, the locking pin 35 freely moves within the bore 43a of the slide check 41 so as to move upward along the bore 43a. In addition, the guide pin 34 guided by the guide groove 30 moves upward at the first inclination portion 30a and reaches the linear portion 30b. In association with the aforementioned operation, the support bracket 31 (the guide pin 34) moves upward relative to the drive shoe 21 so that the movable panel 12 is shifted and bought to the first tilt-up state.

As mentioned above, in a case where the drive shoe 21 is disposed at least at the position that is achieved in a case where the movable panel 12 is shifted from the fully closed state to the first tilt-up state, the rotation cam 48 and the fixation cam 51 of the engagement and disengagement switching mechanism 50 are positioned apart from each other in the front-rear direction. Thus, in a case where the drive shoe 21 moves in the rear direction of the vehicle in the first tilt-up state of the movable panel 12, the locking pin 35 freely moves within the bore 43a of the slide check 41 so as to move downward along the bore 43a. At the same time, the guide pin 34 guided by the guide groove 30 moves downward at the first inclination portion 30a to reach the end (lower end) of the first inclination portion 30a. In association with the aforementioned operation, the support bracket 31 (the guide pin 34) moves downward relative to the drive shoe 21 so that the movable panel 12 is shifted to the fully closed state after tilted-down, i.e., after the tilt-down operation in which the rear portion of the support bracket 31 (the movable panel 12) is lowered with reference to the front portion thereof. That is, as long as the movable panel 12 is shifted between the fully closed state and the first tilt-up state, the movable panel 12 is only tilted (tilted-up and tilted-down) in association with the movement of the drive shoe 21 in the front-rear direction.

On the other hand, in a case where the drive shoe 21 moves further in the front direction of the vehicle in the first tilt-up state of the movable panel 12, the locking pin 35 freely moves within the bore 43a of the slide check 41 so as to further move upward along the bore 43a. In addition, the guide pin 34 guided by the guide groove 30 moves up at the second inclination portion 30c to reach the end (upper end) thereof. In association with the aforementioned operation, the support bracket 31 (the guide pin 34) moves further upward relative to the drive shoe 21 to thereby shift the movable panel 12 to the second tilt-up state. Further, in association with the movement of the drive shoe 21 in the front direction of the vehicle, the engagement recess portion 28 reaches the position at which the pressed portion 46b of the rotation check 46 is provided, thereby allowing the rotation of the rotation check 46.

At this time, the positions of the rotation cam 48 and the fixation cam 51 of the engagement and disengagement switching mechanism 50 overlap each other in the front-rear direction. Thus, the second cam teeth 48b of the rotation cam 48 pass through the open portions 53a of the fixation cam 51 to be pressed by the first cam teeth 52a because the moving path of the second cam teeth 48b to the first cam teeth 52a is cleared and opened by the open portions 53a. Then, the second cam teeth 48b are guided by the first cam teeth 52a to rotate by the aforementioned phase difference between the locking portions 53c and the first cam teeth 52a.

Thereafter, in a case where the drive shoe 21 moves in the rear direction of the vehicle, the second cam teeth 48b of the rotation cam 48 are guided to rotate by the locking portions 53c of the second fixation member 53 to engage with the locking portions 53c. Because of the engagement between the rotation cam 48 and the fixation cam 51, the rotation check 46 and the slide check 41 attempt and try to integrally move with the fixation cam 51 in the rear direction of the vehicle.

At this time, the engagement projection 46a of the rotation check 46, the rotation check 46 being allowed to rotate within the engagement recess portion 28, rotates and enters below the guide portion 17 while being guided by the engagement groove 19a of the guide block 19. The rotation check 46 is restricted from rotating in the aforementioned state, i.e., maintains the aforementioned state. Accordingly, the restriction of movement of the slide check 41 in the front-rear direction is released and also the restriction of movement of the support bracket 31 connected to the slide check 41 via the bore 43a, for example, in the front-rear direction is released. At the same time, the pressed portion 46b of the rotation check 46 enters the engagement recess portion 28 to be disposed on the movement locus of the restriction portion 28a in the front-rear direction.

Accordingly, when the drive shoe 21 moves to the vehicle rear side, the rotation check 46 and the slide check 41 integrally move with the fixation cam 51 in the rear direction. At this time, because a distance in the front-rear direction between the rotation check 46 (the slide check 41) and the fixation cam 51 is kept constant, a distance between the drive shoe 21 and the support bracket 31 in the front-rear direction is kept constant. Thus, the movable panel 12 supported by the support bracket 31 moves in the rear direction of the vehicle while being held in the second tilt-up state to thereby open the opening 10a. The movable panel 12 is brought to the open state accordingly.

In the open state of the movable panel 12, the rotation of the rotation check 46 is restricted in a state where the engagement projection 46a enters below the guide portion 17. The pressed portion 46b of the rotation check 46 is disposed on the moving locus of the restriction portion 28a in the front-rear direction. Accordingly, in the aforementioned state, when the drive shoe 21 moves in the front direction of the vehicle, the restriction portion 28a presses the pressed portion 46b so that the slide check 41 together with the rotation check 46 integrally moves with the drive shoe 21 in the front direction. The integral movement of the slide check 41 with the drive shoe 21 is obtained so that the second cam teeth 48b of the rotation cam 48 and the first cam teeth 52a of the first fixation member 52 are disposed apart from each other in the front-rear direction to inhibit the first cam teeth 52a from pressing the second cam teeth 48b in a case where the drive shoe 21 moves in the front direction of the vehicle in the open state of the movable panel 12. Even in this case, because of the constant distance in the front-rear direction between the slide check 41 and the fixation cam 51, the distance in the front-rear direction between the drive shoe 21 and the support bracket 31 is maintained to be constant. As a result, the movable panel 12 supported by the support bracket 31 closes the opening 10a while being maintained in the second tilt-up state.

In association with the closing operation of the movable panel 12, the movable panel 12 approaches an initial state where the movable panel 12 is shifted to the second tilt-up state. Then, the engagement projection 46a is guided by the engagement groove 19a so that the rotation check 46 rotates in a state where the engagement projection 46a enters an upper end portion of the engagement groove 19a while the pressed portion 46b disengages from the engagement recess portion 28. The rotation check 46 is restricted from rotating in the aforementioned manner, i.e., maintains the aforementioned state. Accordingly, the slide check 41 together with the rotation check 46 is restricted the movement in the front direction of the vehicle. The support bracket 31 connected to the slide check 41 via the bore 43a, for example, is also restricted the movement in the front direction of the vehicle.

In the aforementioned configuration, when the drive shoe 21 moves further in the front direction of the vehicle, the engagement recess portion 28 passes through the pressed portion 46b and the outer side surface of the projection wall portion 24 at the vehicle outer side makes contact with or comes closer to the pressed portion 46b, thereby restricting the rotation of the rotation check 46 in a direction where the engagement projection 46a disengages from the engagement groove 19a. At the same time, the fixation cam 51 moves further forward relative to the rotation cam 48 which is restricted from rotating forward together with the slide check 41. Then, the first cam teeth 52a press the second cam teeth 48b so that the second cam teeth 48b are guided by the first cam teeth 52a to rotate by the phase difference between the locking portions 53c and the first cam teeth 52a. Accordingly, in a case where the fixation cam 51 thereafter moves in the rear direction of the vehicle together with the drive shoe 21, the second cam teeth 48b are guided to rotate by the guide portions 53b, and the moving path of the second cam teeth 48b (the path for retracting from the first cam teeth 52a) to the first cam teeth 52a is opened by the open portions 53a. While the second cam teeth 48b pass through the open portions 53a, the rotation cam 48 releases the engagement with the second fixation member 53 (the fixation cam 51). The fixation cam 51 moves in the rear direction of the vehicle together with the drive shoe 21 while leaving, i.e., not together with, the rotation cam 48, and the like.

At this time, the locking pin 35 freely moves within the bore 43a of the slide check 41 so as to move downward along the bore 43a and the guide pin 34 is guided to move downward along the guide groove 30. As a result, the movable panel 12 is tilted-down and brought to the fully closed state via the first tilt-up state.

In a case where the drive shoe 21 moves in the rear direction of the vehicle in a state where the engagement between the rotation cam 48 and the fixation cam 51 is released, the engagement recess portion 28 reaches but promptly passes through the pressed portion 46b so that the rotation of the rotation check 46 in the direction where the engagement projection 46a disengages from the engagement groove 19a is maintained to be restricted.

According to the embodiment, in a case where the drive shoe 21 moves in the rear direction of the vehicle after moving further in the front direction of the vehicle in the first tilt-up state of the movable panel 12, the restriction of the movement of the movable panel 12 in the front-rear direction is released while the second tilt-up state of the movable panel 12 is maintained by the check mechanism 40. On the other hand, by the pressing effect between the fixation cam 51 and the rotation cam 48, the rotation cam 48 rotates when the drive shoe 21 further moves in the vehicle front direction in the first tilt-up state of the movable panel 12. After that, the rotation cam 48 further rotates when the drive shoe 21 moves in the vehicle rear direction. Then, the fixation cam 51 and the rotation cam 48 engage with each other to integrally move with the movable panel 12. Because of the engagement between the fixation cam 51 and the rotation cam 48, the movable panel 12 is opened while being maintained in the second tilt-up state in a case where the drive shoe 21 moves in the rear direction of the vehicle. In this case, a maximum moving amount of the drive shoe 21, or the like, that specifies the fully open state of the movable panel 12 is not restricted or constrained by a moving amount of the drive shoe 21 in an opposite direction (i.e., in the front direction of the vehicle) for achieving the tilt-up state of the movable panel 12. Therefore, the maximum moving amount of the drive shoe 21 or the like that specifies the fully open state of the movable panel 12, i.e., the opening amount of the movable panel 12 may increase.

Especially, the fixation cam 51 is mounted to the drive shoe 21 by moving the fixation cam 51 from the upper side to downward. Accordingly, the mounting projection 67 is fitted by the mounting recessed portion 63 so that the mounting recessed portion 63 restricts the movement of the mounting projection 67 in the front-rear direction. In addition, the engagement pawls 61a, 62a retain the mounting projection 67. Thus, the fixation cam 51 is mounted and fixed to the drive shoe 21 in a manner that the movement of the fixation cam 51 in the front-rear direction and the downward-upward direction is restricted simultaneously. As above, the mountability of the fixation cam 51 may be enhanced. Further, the fixation cam 51 is restricted the movement from the upper side to downward by being mounted to the drive shoe 21.

According to the aforementioned embodiment, the guide portion 17 further restricts the movement of the fixation cam 51 from the upper side to downward. Accordingly, the mounting projection 67 may not be disengaged from the mounting recessed portion 63, and the fixation cam 51 may not be disengaged from the drive shoe 21.

According to the embodiment, comparing to a case where, for example, an upward restriction portion is individually formed, the sunroof apparatus 11 for the vehicle may be downsized because the guide rail 13 includes the guide portion 17 serving as the upward restriction portion.

According to the embodiment, the first cut-out portion 25a and the corner portion 26a restrict the movement of the fixation cam 51 in the front-rear direction. Accordingly, the fixation cam 51 may be more stably positioned, or postured.

According to the embodiment, the shoe portion 22c and the restriction wall portion 64 restrict the movement of the fixation cam 51 in the vehicle width direction. Accordingly, the fixation cam 51 may be more stably positioned, or postured.

In the embodiment, the second cam teeth 48b passing through the open portions 53a are pressed by the first cam teeth 52a in a case where the drive shoe 21 moves further in the front direction in the first tilt-up state of the movable panel 12 and then pressed by the locking portions 53c when the drive shoe 21 moves in the rear direction of the vehicle. Thus, the second cam teeth 48b rotate by the predetermined angle (90°) to engage with the locking portions 53c. Accordingly, because of the engagement between the locking portions 53c and the second cam teeth 48b, the fixation cam 51 engages with the rotation cam 48 so that the movable panel 12 integrally moves with the drive shoe 21 when the drive shoe 21 moves in the vehicle rear direction. Accordingly, the fixation cam 51 and the rotation cam 48 are engageable with each other by a simple configuration of the engagement and disengagement switching mechanism 50 in which the second cam teeth 48b which pass through the open portions 53a are sequentially pressed by the first cam teeth 52a and the locking portions 53c to rotate by the predetermined angle.

In a case where the drive shoe 21 moves in the front direction of the vehicle in the open state of the movable panel 12, the movable panel 12 is held in the second tilt-up state while the restriction of the movement of the movable panel 12 in the front-rear direction is released until the movable panel 12 returns to an initial restored state corresponding to a state in which the movable panel 12 is shifted from the fully closed state to the second tilt-up state by the check mechanism 40. Then, the pressed portion 46b of the rotation check 46 is pressed by the restriction portion 28a so that the movable panel 12 integrally moves with the drive shoe 21 (in addition to the slide check 41 and the support bracket 31) in the front direction of the vehicle. The movable panel 12 is closed while being maintained in the second tilt-up state accordingly. In this case, by the pressing of the restriction portion 28a relative to the pressed portion 46b (the movable panel 12), the second cam teeth 48b are restricted from being pressed by the first cam teeth 52a, which may avoid the operation of the engagement and disengagement switching mechanism 50 from being unstable due to the rotation of the second cam teeth 48b, for example.

Thereafter, once the movable panel 12 returns to the aforementioned restored state, the movement of the movable panel 12 in the front-rear direction is restricted by the check mechanism 40 in a case where the drive shoe 21 moves further in the front direction of the vehicle, and the holding of the movable panel 12 in the second tilt-up state is released. On the other hand, the second cam teeth 48b are pressed by the first cam teeth 52a in a case where the drive shoe 21 moves further in the front direction of the vehicle in the restored state of the movable panel 12 and are then guided to the open portions 53a in a case where the drive shoe 21 thereafter moves in the rear direction of the vehicle. The second cam teeth 48b rotate by the predetermined angle (90°) to pass through the open portions 53a. Accordingly, because the engagement between the fixation cam 51 and the rotation cam 48 is released, the drive shoe 21 moves in the rear direction of the vehicle while leaving. i.e., without being together with the movable panel 12. Therefore, because of the simple configuration in which the second cam teeth 48b are pressed against the first cam teeth 52a and guided by the open portions 53a (the guide portions 53b) so as to rotate by the predetermined angle, the engagement and disengagement switching mechanism 50 may release the engagement between the fixation cam 51 and the rotation cam 48.

In association with the movement of the drive shoe 21 in the rear direction of the vehicle, the movable panel 12 is brought to the fully closed state as the rear portion thereof is lowered with reference to the front portion. In this case, the moving amount of the drive shoe 21 in a case where the movable panel 12 is shifted from the tilt-up state to the fully closed state may be sufficiently secured, thereby reducing a load per unit movement amount of the drive shoe 21 (a motor output) and avoiding enlargement of the electric drive source 15.

Specifically, in a case where a function is provided for determining that something is caught by in the movable panel 12 in a case where fluctuation in rotation speed of the motor exceeds a predetermined threshold value (which will be hereinafter referred to as a reverse rotation load) in association with the opening and closing operation of the movable panel 12 so as to reverse the movable panel 12, a small fluctuation of rotation speed in a normal operation state may result in a reduction of reverse rotation load. That is, even though the reverse rotation load is reduced, a possibility of wrong determination that something is caught in the movable panel 12 by the aforementioned function may be reduced. In this case, EU regulations requiring the reverse rotation load equal to or greater than 100N may be satisfied. The movable panel 12 may be configured to be automatically closed.

In the embodiment, the restriction of the movement of the movable panel 12 in the front-rear direction and the release of the aforementioned restriction by the check mechanism 40 are switched by the engagement and disengagement between the engagement projection 46a and the engagement groove 19a in association with the rotation of the rotation check 46 around the support shaft 45. On the other hand, the engagement between the fixation cam 51 and the rotation cam 48 is achieved by the further movement of the drive shoe 21 in the front direction of the vehicle, i.e., the movement of the support shaft 45 along the center line thereof, in the first-tilt up state of the movable panel 12. Accordingly, the restriction of the movement of the movable panel 12 and the release of the restriction by the check mechanism 40, and the engagement between the fixation cam 51 and the rotation cam 48 are both achieved in association with the movement of the drive shoe 21 in the front-rear direction along the moving direction thereof. The rotation cam 48 and the rotation check 46 are disposed around the support shaft 45 in an intensive manner to thereby achieve downsizing of the entire sunroof apparatus 11.

In the embodiment, the rotation cam 48 is rotatably connected to the slide check 41 of the check mechanism 40 so that the rotation cam 48 is disposed at the check mechanism 40 in an intensive manner, which results in downsizing of the entire sunroof apparatus 11. Specifically, the rotation check 46 and the second cam teeth 48b are disposed to be coaxial with each other, which results in further downsizing of the entire sunroof apparatus 11.

In the embodiment, the maximum moving amount of the drive shoe 21 or the like, that specifies the tilt-up state of the movable panel 12 is not limited by the moving amount of the drive shoe 21 in the opposite direction (i.e., in the rear direction of the vehicle) for shifting the movable panel 12 to the open state. Thus, the maximum moving amount of the drive shoe 21 or the like that specifies the tilt-up state of the movable panel 12, i.e., the opening amount of the movable panel 12 in the tilt-up state, may increase.

The embodiment may be modified or changed as below. The shoe portion 22c and the mounting portions 60 may restrict the movement of the fixation cam 51 in the vehicle width direction.

According to the embodiment, the shoe portion 22c and the restriction wall portion 64 serving as the width-direction restriction portions do not restrict the movement of the fixation cam 51 in the vehicle width direction. For example, the restriction wall portion 64 are not provided.

According to the embodiment, the first cut-out portion 25a and the corner portion 26a serving as the front-rear direction restriction portions do not restrict the movement of the fixation cam 51 in the front-rear direction. For example, the fixation cam 51 may be mounted to the connection wall portions 25, 26 so as to be extended thereover.

According to the embodiment, instead of the guide portion 17 of the guide rail 13, an individually-provided upward restriction portion may restrict the movement of the fixation cam 51 from the lower side to upward.

According to the embodiment, the guide portion 17 serving as the upward restriction portion does not restrict the movement of the fixation cam 51 from the lower side to upward.

According to the embodiment, the number of the mounting recessed portion 63 and the number of the mounting projection 67 fitting to the mounting recessed portion 63 may be appropriately determined.

Figure 10:
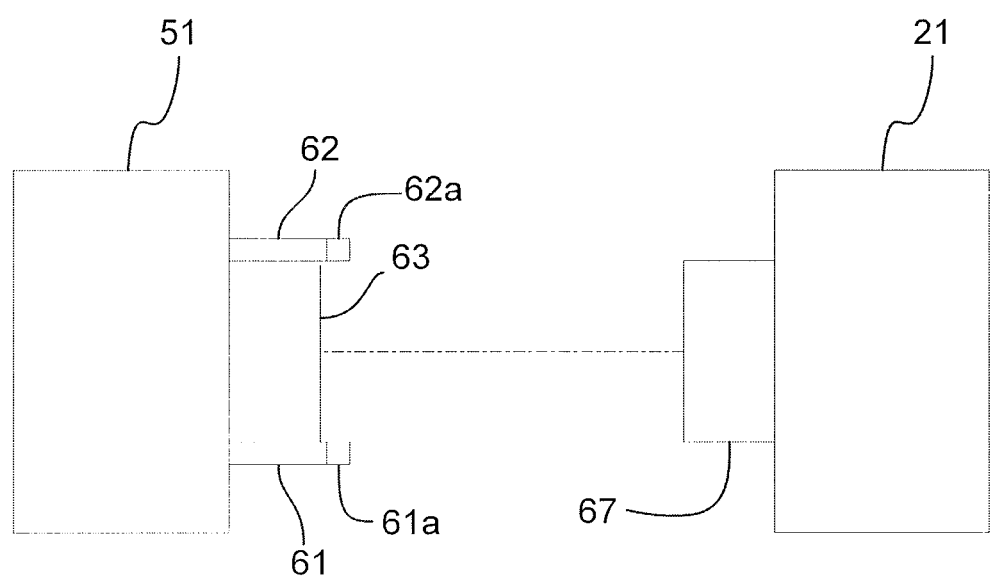
FIG. 10 is a schematic view of an embodiment including a reversed arrangement of a drive shoe and a fixation cam.

According to the embodiment, the drive shoe 21 and the fixation cam 51 are provided with the mounting recessed portion 63 and the mounting projection 67, respectively. Alternatively, the arrangement relationship between the drive shoe 21 and the fixation cam 51 may be reversed as shown in FIG. 10. In the reversed arrangement shown in FIG. 10, the mounting projection 67 is provided on the drive shoe 21 and the mounting recessed portion 63 is provided on the fixation cam 51.

According to the embodiment, the shape of the engagement pawl 61a, 62a which retains the mounting projection 67 may be an example.

According to the embodiment, an engagement pawl which retains the mounting projection 67 may be provided at the mounting projection 67. In those circumstances, for example, the clamping pieces 61, 62 may be formed with an appropriate recessed portion which is able to be inserted by the engagement pawl in a state where the mounting projection 67 is fitted to the clamping pieces 61, 62.

According to the embodiment, one of the engagement pawls 61a, 62a which retain the mounting projection 67 is not included.

The number of the second cam teeth 48b of the rotation cam 48 and the arrangement of the second cam teeth 48b of the rotation cam 48 may be appropriately specified. In this case, then, the first cam teeth 52a, for example, may be provided to match the angle range in which the second cam teeth 48b are formed.

The linear portion 30b of the guide groove 30 may be omitted. In the embodiment, the restriction of the movement of the movable panel 12 and the release of the restriction by the check mechanism 40 are switched by the engagement and disengagement between the engagement projection 46a and the engagement groove 19a in association with the rotation of the rotation check 46. Alternatively, the restriction of the movement of the movable panel 12 and the release of the restriction may be switched by the movement of the rotation check 46 in the vehicle height direction or the width direction as long as the check mechanism 40 achieves the restriction of the movement of the movable panel 12 and the release of the restriction by an electric control, for example. The arrangement and configuration of the check mechanism 40, for example, may be appropriately specified.

In the embodiment, the rotation check 46 and the rotation cam 48 are integrally connected to the slide check 41. Alternatively, the rotation check 46 and the rotation cam 48 may be connected individually to a peripheral edge portion of the movable panel 12.

In the embodiment, the rotation check 46 and the engagement and disengagement switching mechanism 50 (the rotation cam 48 and the fixation cam 51) are arranged to be coaxial with each other. Alternatively, as long as axes of the rotation check 46, the rotation cam 48 and the fixation cam 51 extend in the front-rear direction, the rotation check 46 and the engagement and disengagement switching mechanism 50 (the rotation cam 48 and the fixation cam 51) are inhibited from being coaxial with each other.

In a case where the movable panel 12 is shifted from the open state to the closed state, the restriction portion 28a presses the pressed portion 46b of the rotation check 46. Alternatively, the restriction portion 28a may press an appropriate position at the movable panel 12 as long as no functional problems occur, for example.

In the embodiment, as the tilt-up state of the movable panel 12, the first tilt-up state and the second tilt-up state in which the movable panel 12 is further tilted-up than in the first tilt-up state are specified. Alternatively, the posture of the movable panel 12 in a case where the movable panel 12 is shifted from the fully closed state and the posture of the movable panel 12 in a case where the movable panel 12 slides on the guide rail 13 may coincide with each other.

According to the embodiment, the connection condition of the drive shoe 21 and the support bracket 31 (moving panel 12) is an example. For example, the support bracket 31 (the vertical wall portion 32) may be formed with a guide groove which is formed in a reverse direction of the guide groove 30, and a guide pin which movably fits the guide groove is fixed to the drive shoe 21.

According to the embodiment, the guide block 19 may be integrally formed with the guide rail 13. Next, the technical idea and the effect that can be grasped in response to the above-described embodiment and the above-described modified example are described below.

According to the aforementioned embodiment, the fixation cam 51 includes the first fixation member 52 including the plural first cam teeth 52a disposed at every predetermined angle around the axis line that extends in the front-rear direction and formed in the projection and recess manner in the direction of the axis line, the fixation cam 51 including the second fixation member 53 that is disposed at the side of the first fixation member 52 facing the rotation cam 48 and that includes the open portion 53a configured to open a path to the first cam teeth 52a and the locking portion 53c configured to close the path to the first cam teeth 52a, each of the open portion 53a and the locking portion 53c being disposed at the every predetermined angle around the axis line, and the rotation cam 48 is connected to be rotatable about the axis line and includes the second cam tooth 48b, the second cam tooth 48b passing through the open portion 53a to be pressed by one of the first cam teeth 52a in a case where the drive shoe 21 moves further in the front direction in the tilt-up state of the movable panel 12 and being pressed by the locking portion 53c in a case where the drive shoe 21 thereafter moves in the rear direction so that the second cam tooth 48b rotates by the predetermined angle to engage with the locking portion 53c.

Accordingly, the second cam tooth 48b passing through the open portion 53a is pressed by one of the first cam teeth 52a in a case where the drive shoe 21 moves further in the front direction in the first tilt-up state of the movable panel 12 and then pressed by the locking portion 53c when the drive shoe 21 thereafter moves in the rear direction of the vehicle. Thus, the second cam tooth 48b rotates by the predetermined angle to engage with the locking portion 53a. Accordingly, because of the engagement between the locking portion 53a and the second cam tooth 48b, the fixation cam 51 engages with the rotation cam 48 so that the movable panel 12 integrally moves with the drive shoe 21 together with the slide check 41 in a case where the drive shoe 21 moves in the rear direction of the vehicle. Accordingly, the fixation cam 51 and the rotation cam 48 are engageable with each other by a simple configuration of the sunroof apparatus in which the second cam tooth 48b which passes through the open portion 53a is sequentially pressed by one of the first cam teeth 52a and the locking portion 53c to rotate by the predetermined angle.

According to the aforementioned configuration, the check mechanism 40 maintains the movable panel 12 in the tilt-up state while releasing the restriction of the movement of the movable panel 12 in the front-rear direction until the movable panel 12 returns to an initial restored state in a case where the drive shoe 21 moves in the front direction in an open state of the movable panel 12, the initial restored state corresponding to a state in which the movable panel is shifted to the tilt-up state from the fully closed state, the sunroof apparatus 11 further including the restriction portion 28a restricting the second cam tooth 48b from being pressed by one of the first cam teeth 52a until the movable panel 12 returns to the initial restored state in a case where the drive shoe 21 moves in the front direction in the open state of the movable panel 12, wherein the second cam tooth 48b is pressed by one of the first cam teeth 52a in a case where the drive shoe 21 moves further in the front direction in the initial restored state of the movable panel 12 and is guided to the open portion 53a in a case where the drive shoe 21 thereafter moves in the rear direction on that the second cam tooth 48b rotates by the predetermined angle to pass through the open portion 53a.

Accordingly, in a case where the drive shoe 21 moves in the front direction of the vehicle in the open state of the movable panel 12, the movable panel 12 is held in the tilt-up state while the restriction of the movement of the movable panel 12 in the front-rear direction is released until the movable panel 12 returns to the initial restored state by the check mechanism 40. Then, the movable panel 12 integrally moves with the drive shoe 21 in the front direction of the vehicle. The movable panel 12 is closed while being maintained in the second tilt-up state accordingly. In this case, the second cam tooth 48b is restricted from being pressed by one of the first cam teeth 52a by the restriction portion 28a, which may avoid an operation of the engagement and disengagement switching mechanism from being unstable.

Thereafter, once the movable panel 12 returns to the initial restored state, the movement of the movable panel 12 in the front-rear direction is restricted by the check mechanism 40, and the holding of the movable panel 12 in the tilt-up state is released. On the other hand, the second cam tooth 48b is pressed by one of the first cam teeth 52a in a case where the drive shoe 21 moves further in the front direction of the vehicle in the initial restored state of the movable panel 12 and is then guided to the open portion 53a in a case where the drive shoe 21 thereafter moves in the rear direction of the vehicle. The second cam tooth 48b rotates by the predetermined angle to pass through the open portion 53a. Accordingly, because the engagement between the fixation cam 51 and the rotation cam 48 is released, the drive shoe 21 moves in the rear direction of the vehicle while leaving, i.e., without being together with the movable panel 12. Therefore, because of the simple configuration in which the second cam tooth 48b is pressed against one of the first cam teeth 52a and guided by the open portion 53a so as to rotate by the predetermined angle, the sunroof apparatus 11 may release the engagement between the fixation cam 51 and the rotation cam 48.

In association with the movement of the drive shoe 21 in the rear direction of the vehicle, the movable panel 12 is brought to the fully closed state as the rear portion thereof is lowered with reference to the front portion. In this case, the moving amount of the drive shoe 21 in a case where the movable panel 12 is shifted from the tilt-up state to the fully closed state may be sufficiently secured, thereby reducing a load per unit movement amount of the drive shoe 21 and avoiding enlargement of the electric drive source 15.

According to the aforementioned embodiment, the check mechanism (40) includes a guide block (19) formed with an engagement groove (19a) and being provided at the guide rail (13), and a rotation check (46) including an engagement projection (46a) engageable with the engagement groove (19a), the rotation check (46) rotatably connected to said each edge portion of the movable panel (12) in the vehicle width direction about a second axis line extending in the front-rear direction of the vehicle, the rotation check (46) restricting the movement of the movable panel (12) when the first sliding member (the drive shoe 21) moves in the front direction of the vehicle in a state where the engagement projection (46a) is fitted to the engagement groove (19a) and restricted from rotating in the fully closed state, the rotation check (46) releasing the restriction of the movement of the movable panel (12) by being rotationally guided to disengage the engagement projection (46a) from the engagement groove (19a) when moving the first sliding member (the drive shoe 21) in the rear direction of the vehicle after the rotation check (46) is allowed to rotate when the first sliding member (the drive shoe 21) further moves to the front direction of the vehicle in the tilt-up state.

In the embodiment, the restriction of the movement of the movable panel 12 in the front-rear direction and the release of the aforementioned restriction by the check mechanism 40 are switched by the engagement and disengagement between the engagement projection 46a and the engagement groove 19a in association with the rotation of the rotation check 46 about the second axis line. On the other hand, the engagement between the fixation cam 51 and the rotation cam 48 is achieved by the further movement of the drive shoe 21 in the front direction of the vehicle, i.e., the movement of the drive shoe 21 along the second axis line, in the first-tilt up state of the movable panel 12. Accordingly, the restriction of the movement of the movable panel 12 and the release of the restriction by the check mechanism 40, and the engagement between the fixation cam 51 and the rotation cam 48 are both achieved in association with the movement of the drive shoe 21 in the front-rear direction along the moving direction thereof. The rotation cam 48 and the rotation check 46 are disposed in an intensive manner by connecting the rotation check 46 to the rotation cam 48 to thereby achieve downsizing of the entire sunroof apparatus 11.

According to the aforementioned embodiment, the check mechanism (40) includes a second sliding member (the slide check 41) movably provided along the guide rail (13), the second sliding member (the slide check 41) connected to said each edge portion of the movable panel (12) in the vehicle width direction so as to allow the movable panel (12) to shift to the tilted-up state when the first sliding member (the drive shoe 21) moves in the front direction of the vehicle in the fully closed state, and the second member (the rotation cam 48) is rotatably connected to the second sliding member (the slide check 41) about the first axis line.

According to the aforementioned embodiment, the rotation cam 48 and the check mechanism 40 are disposed in an intensive manner by connecting the rotation check 46 of the check mechanism 40 to the rotation cam 48 to thereby achieve downsizing of the entire sunroof apparatus 11. Specifically, by adopting this configuration to the construction of the check mechanism which includes the guide block 19 and the rotation check 46, the entire sunroof apparatus 11 for the vehicle may be further downsized. In those circumstances, by positioning the rotation check 46 and the rotation cam 48 (the first axis line and the second axis line) to be coaxial with each other, the entire sunroof apparatus 11 may be further downsized.

According to the aforementioned configuration, the sunroof apparatus (11) for the vehicle includes the movable panel (12) configured to open and close the opening (10a) formed at the roof (10) of the vehicle, the guide rail (13) provided at each edge portion of the opening (10a) in the vehicle width direction and being extended in the front-rear direction of the vehicle, the first sliding member (the drive shoe 21) connected to each edge portion of the movable panel (12) in the vehicle width direction and movably provided along the guide rail (13), the first sliding member (the drive shoe 21) being driven to move by the drive source (15), the check mechanism (40) restricting the movement of the movable panel (12) in the front-rear direction in a case where the first sliding member (the drive shoe 21) moves in the front direction of the vehicle in a fully closed state of the movable panel (12) to bring the movable panel (12) to a tilt-up state in which the rear portion of the movable panel (12) is raised with the front portion of the movable panel (12) as a fulcrum, the check mechanism (40) releasing the restriction of the movement of the movable panel (12) while maintaining the tilt-up state of the movable panel (12) in a case where the first sliding member (the drive shoe 21) moves in the rear direction after moving further in the front direction in the tilt-up state of the movable panel (12), the first member (the fixation cam 51) mounted to the first sliding member (the drive shoe 21), and the second member (the rotation cam 48) provided at said each edge portion of the movable panel (12) in the vehicle width direction and being rotatably supported about the first axis line extending in the vehicle front-rear direction. The first member (the fixation cam 51) and the second member (the rotation cam 48) configured to engage with each other so that the first member (the fixation cam 51) and the second member (the rotation cam 48) integrally move with the movable panel (12), the second member (the rotation cam 48) rotating when the first sliding member (the drive shoe 21) further moves in the front direction of the vehicle in the tilt-up state by a pressing effect between the first member (the fixation cam 51) and the second member (the rotation cam 48), the second member (the rotation cam 48) further rotating when the first sliding member (the drive shoe 21) moves in the rear direction of the vehicle in the tilt-up state thereafter by the pressing effect between the first member (the fixation cam 51) and the second member (the rotation cam 48). One of the first sliding member (the drive shoe 21) and the first member (the fixation cam 51) includes the mounting recessed portion (63). The other of the first sliding member (the drive shoe 21) and the first member (the fixation cam 51) includes the mounting projection (67) fitted to the mounting recessed portion (63) in the moving direction of the first member (the fixation cam 51) from the upper side to downward in the vehicle height direction, the mounting projection (67) restricted a movement in the front-rear direction of the vehicle. One of the first sliding member (the drive shoe 21) and the first member (the fixation cam 51) includes the engagement pawl (62a) retaining the mounting projection (67).

According to the embodiment, in a case where the drive shoe 21 moves in the rear direction of the vehicle after moving further in the front direction of the vehicle in the first tilt-up state of the movable panel 12, the restriction of the movement of the movable panel 12 in the front-rear direction is released while the second tilt-up state of the movable panel 12 is maintained by the check mechanism 40. On the other hand, by the pressing effect between the fixation cam 51 and the rotation cam 48, the rotation cam 48 rotates when the drive shoe 21 further moves in the vehicle front direction in the first tilt-up state of the movable panel 12. After that, the rotation cam 48 further rotates when the drive shoe 21 moves in the vehicle rear direction. Then, the fixation cam 51 and the rotation cam 48 engage with each other to integrally move with the movable panel 12. Because of the engagement between the fixation cam 51 and the rotation cam 48, the movable panel 12 is opened while being maintained in the second tilt-up state in a case where the drive shoe 21 moves in the rear direction of the vehicle. In this case, a maximum moving amount of the drive shoe 21, or the like, that specifies the fully open state of the movable panel 12 is not restricted or constrained by a moving amount of the drive shoe 21 in an opposite direction (i.e., in the front direction of the vehicle) for achieving the tilt-up state of the movable panel 12. Therefore, the maximum moving amount of the drive shoe 21 or the like that specifies the fully open state of the movable panel 12, i.e., the opening amount of the movable panel 12, may increase.

Especially, the fixation cam 51 is mounted to the drive shoe 21 by moving the fixation cam 51 from the upper side to downward. Accordingly, the mounting projection 67 is fitted by the mounting recessed portion 63 so that the mounting recessed portion 63 restricts the movement of the mounting projection 67 in the front-rear direction. In addition, the engagement pawls 61a, 62a retain the mounting projection 67. Thus, the fixation cam 51 is mounted and fixed to the drive shoe 21 in a manner that the movement of the fixation cam 51 in the front-rear direction and the downward-upward direction is restricted simultaneously. As above, the mountability of the fixation cam 51 may be enhanced.

According to the aforementioned embodiment, the sunroof apparatus (11) for the vehicle further includes the upward restriction portion (the guide portion 17) restricting the movement of the first member (the fixation cam 51) from the lower side to upward in the vehicle height direction in a state where the mounting projection (67) is fitted to the mounting recessed portion (63).

According to the aforementioned embodiment, the guide portion 17 further restricts the movement of the fixation cam 51 from the upper side to downward in the vehicle height direction. Accordingly, the mounting projection 67 may not be disengaged from the mounting recessed portion 63, and the fixation cam 51 may not be disengaged from the drive shoe 21.

According to the aforementioned embodiment, the guide rail (13) includes the upward restriction portion (the guide portion 17).

According to the embodiment, comparing to a case where, for example, the upward restriction portion is individually formed, the sunroof apparatus 11 for the vehicle may be downsized because the guide rail 13 includes the guide portion 17 serving as the upward restriction portion.

According to the aforementioned embodiment, the first sliding member (the drive shoe 21) includes the front-rear direction restriction portion (the first cut-out portion 25a, the corner portion 26a) restricting the movement of the first member (the fixation cam 51) in the vehicle front-rear direction.

According to the embodiment, the first cut-out portion 25a and the corner portion 26a restrict the movement of the fixation cam 51 in the front-rear direction. Accordingly, the fixation cam 51 may be more stably positioned, or postured.

According to the aforementioned embodiment, the first sliding member (the drive shoe 21) includes the width direction restriction portion (the shoe portion 22c and the restriction wall portion 64) restricting a movement of the first member (the fixation cam 51) in the vehicle width direction.

According to the embodiment, the shoe portion 22c and the restriction wall portion 64 restrict the movement of the fixation cam 51 in the vehicle width direction. Accordingly, the fixation cam 51 may be more stably positioned, or postured.

According to the disclosure, the opening amount of the movable panel 12 in the tilt-up state may increase.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A sunroof apparatus for a vehicle, comprising:
 a movable panel configured to open and close an opening formed at a roof of a vehicle;
 a guide rail provided at each edge portion of the opening in a vehicle width direction and being extended in a front-rear direction of the vehicle;
 a first sliding member connected to each edge portion of the movable panel in the vehicle width direction and movably provided along the guide rail, the first sliding member being driven to move by a drive source;
 a check mechanism restricting a movement of the movable panel in a front-rear direction in a case where the first sliding member moves in a front direction of the vehicle in a fully closed state of the movable panel to bring the movable panel to a tilt-up state in which a rear portion of the movable panel is raised with a front portion of the movable panel as a fulcrum, the check mechanism releasing the restriction of the movement of the movable panel while maintaining the tilt-up state of the movable panel in a case where the first sliding member moves in the rear direction after moving further in the front direction in the tilt-up state of the movable panel;
 a first member mounted to the first sliding member; and
 a second member provided at said each edge portion of the movable panel in the vehicle width direction and being rotatably supported about a first axis line extending in the vehicle front-rear direction; wherein
 the first member and the second member configured to engage with each other so that the first member and the second member integrally move with the movable panel, the second member rotating when the first sliding member further moves in the front direction of the vehicle in the tilt-up state by a pressing effect between the first member and the second member, the second member further rotating when the first sliding member moves in the rear direction of the vehicle in the tilt-up state thereafter by the pressing effect between the first member and the second member;
 one of the first sliding member and the first member includes a mounting recessed portion;
 the other of the first sliding member and the first member includes a mounting projection fitted to the mounting recessed portion in a moving direction of the first member from an upper side to downward in a vehicle height direction, the mounting projection restricted a movement in the front-rear direction of the vehicle; and
 one of the first sliding member and the first member includes an engagement pawl retaining the mounting projection.

2. The sunroof apparatus for the vehicle according to claim 1, further comprising:
 an upward restriction portion restricting a movement of the first member from a lower side to upward in the vehicle height direction in a state where the mounting projection is fitted to the mounting recessed portion.

3. The sunroof apparatus for the vehicle according to claim 2, wherein the guide rail includes the upward restriction portion.

4. The sunroof apparatus for the vehicle according to claim 1, wherein the first sliding member includes a front-rear direction restriction portion restricting a movement of the first member in the vehicle front-rear direction.

5. The sunroof apparatus for the vehicle according to claim 2, wherein the first sliding member includes a front-rear direction restriction portion restricting the movement of the first member in the vehicle front-rear direction.

6. The sunroof apparatus for the vehicle according to claim 3, wherein the first sliding member includes a front-rear direction restriction portion restricting the movement of the first member in the vehicle front-rear direction.

7. The sunroof apparatus for the vehicle according to claim 1, wherein the first sliding member includes a width direction restriction portion restricting a movement of the first member in the vehicle width direction.

8. The sunroof apparatus for the vehicle according to claim 2, wherein the first sliding member includes a width direction restriction portion restricting the movement of the first member in the vehicle width direction.

9. The sunroof apparatus for the vehicle according to claim 3, wherein the first sliding member includes a width direction restriction portion restricting the movement of the first member in the vehicle width direction.

10. The sunroof apparatus for the vehicle according to claim 4, wherein the first sliding member includes a width direction restriction portion restricting the movement of the first member in the vehicle width direction.

11. The sunroof apparatus according to claim 1, wherein the first member includes a first fixation member including a plurality of first cam teeth disposed at every predetermined angle around the first axis line that extends in the front-rear direction and formed in a projection and recess manner in a direction of the first axis line, the first member including a second fixation member that is disposed at a side of the first fixation member facing the second member and that includes an open portion configured to open a path to the first cam teeth and a locking portion configured to close the path to the first cam teeth, each of the open portion and the locking portion being disposed at the every predetermined angle around the first axis line, and the second member is connected to be rotatable about the first axis line and includes a second cam tooth, the second cam tooth passing through the open portion to be pressed by one of the first cam teeth in a case where the first sliding member moves further in the front direction in the tilt-up state of the movable panel and being pressed by the locking portion in a case where the first sliding member thereafter moves in the rear direction so that the second cam tooth rotates by the predetermined angle to engage with the locking portion.

12. The sunroof apparatus according to claim 1, wherein the check mechanism maintains the movable panel in the tilt-up state while releasing the restriction of the movement of the movable panel in the front-rear direction until the movable panel returns to an initial restored state in a case where the first sliding member moves in the front direction in an open state of the movable panel, the initial restored state corresponding to a state in which the movable panel is shifted to the tilt-up state from the fully closed state, the sunroof apparatus further including a restriction portion restricting the second cam tooth from being pressed by one of the first cam teeth until the movable panel returns to the initial restored state in a case where the first sliding member moves in the front direction in the open state of the movable panel, wherein the second cam tooth is pressed by one of the first cam teeth in a case where the first sliding member moves further in the front direction in the initial restored state of the movable panel and is guided to the open portion in a case where the first sliding member thereafter moves in the rear direction so that the second cam tooth rotates by the predetermined angle to pass through the open portion.

13. The sunroof apparatus according to claim 1, wherein the check mechanism includes:
   a guide block formed with an engagement groove and being provided at the guide rail; and
   a rotation check including an engagement projection engageable with the engagement groove, the rotation check rotatably connected to said each edge portion of the movable panel in the vehicle width direction about a second axis line extending in the front-rear direction of the vehicle, the rotation check restricting the movement of the movable panel when the first sliding member moves in the front direction of the vehicle in a state where the engagement projection is fitted to the engagement groove and restricted from rotating in the fully closed state, the rotation check releasing the restriction of the movement of the movable panel by being rotationally guided to disengage the engagement projection from the engagement groove when moving the first sliding member in the rear direction of the vehicle after the rotation check is allowed to rotate when the first sliding member further moves to the front direction of the vehicle in the tilt-up state.

14. The sunroof apparatus according to claim 1, wherein the check mechanism includes a second sliding member movably provided along the guide rail, the second sliding member connected to said each edge portion of the movable panel in the vehicle width direction so as to allow the movable panel to shift to the tilted-up state when the first sliding member moves in the front direction of the vehicle in the fully closed state, and
the second member is rotatably connected to the second sliding member about the first axis line.

* * * * *